(12) United States Patent
Marris et al.

(10) Patent No.: US 12,390,690 B2
(45) Date of Patent: Aug. 19, 2025

(54) SYSTEMS AND METHODS FOR TRACKING A SPORTS OBJECT

(71) Applicant: Chip'D Inc., Winchester, CA (US)

(72) Inventors: Joshua L. Marris, Winchester, CA (US); Brandon Pollack, Lake Forest, CA (US); Anil K. Agarwal, Rancho Mission Viejo (CA)

(73) Assignee: CHIP'D INC., Winchester, CA (US)

( * ) Notice: Subject to any disclaimer, the term of this patent is extended or adjusted under 35 U.S.C. 154(b) by 0 days.

(21) Appl. No.: 18/942,962

(22) Filed: Nov. 11, 2024

(65) Prior Publication Data
US 2025/0065190 A1  Feb. 27, 2025

Related U.S. Application Data

(63) Continuation of application No. 17/971,761, filed on Oct. 24, 2022, now Pat. No. 12,138,509.

(51) Int. Cl.
| | |
|---|---|
| *H01Q 1/27* | (2006.01) |
| *A63B 24/00* | (2006.01) |
| *A63B 43/00* | (2006.01) |
| *H01Q 1/38* | (2006.01) |
| *H02J 50/10* | (2016.01) |

(52) U.S. Cl.
CPC ........ *A63B 24/0021* (2013.01); *A63B 43/004* (2013.01); *H01Q 1/27* (2013.01); *H01Q 1/38* (2013.01); *H02J 50/10* (2016.02); *A63B 2024/0028* (2013.01); *A63B 2220/833* (2013.01); *A63B 2225/50* (2013.01)

(58) Field of Classification Search
None
See application file for complete search history.

(56) References Cited

U.S. PATENT DOCUMENTS

| | | | |
|---|---|---|---|
| 6,157,898 | A | 12/2000 | Marinelli |
| 9,592,424 | B2 | 3/2017 | Savarese et al. |
| 11,344,785 | B1 | 5/2022 | Raposo et al. |
| 2002/0091019 | A1 | 7/2002 | Bays et al. |
| 2005/0085316 | A1 | 4/2005 | Barr |
| 2005/0259002 | A1 | 11/2005 | Erario et al. |
| 2006/0122007 | A1* | 6/2006 | Savarese .......... G06K 19/07758 473/351 |

(Continued)

OTHER PUBLICATIONS

Int'l Search and Written Opinion Appln No. PCT/US2018/012690 mailed Mar. 7, 2018.

*Primary Examiner* — John F Mortell
(74) *Attorney, Agent, or Firm* — McAndrews, Held & Malloy, Ltd.

(57) ABSTRACT

Systems and methods for tracking a sports object are provided. A sports object includes a core assembly arranged within a shell and having multiple components to receive and transmit signals corresponding to movement of the sports object, as well as to support operational tracking of the sports object. The core assembly includes a multi-layer printed circuit board (PCB) comprised of a plurality of sections. The PCB is configured to at least partially envelope the energy storage device at a geometric center of the assembly. The PCB is connected to one or more antennas (e.g., via one or more contacts), which may be arranged on one or more sections of the PCB, arranged on a surface of the shell, and/or in a volume within the shell.

20 Claims, 5 Drawing Sheets

(56) References Cited

U.S. PATENT DOCUMENTS

| | | |
|---|---|---|
| 2007/0021226 A1 | 1/2007 | Tyroler |
| 2010/0184563 A1 | 7/2010 | Molyneux et al. |
| 2011/0230274 A1 | 9/2011 | Lafortune et al. |
| 2015/0009629 A1* | 1/2015 | Moon ............... H05K 5/06 29/842 |
| 2015/0105173 A1 | 4/2015 | Thurman et al. |
| 2016/0138824 A1* | 5/2016 | Patel ............... G01V 8/10 250/338.1 |
| 2020/0324171 A1 | 10/2020 | Semsak et al. |
| 2022/0357440 A1 | 11/2022 | Hugmark et al. |
| 2023/0033421 A1* | 2/2023 | Goodchild ......... A63B 69/3658 |

\* cited by examiner

SYSTEMS AND METHODS FOR TRACKING A SPORTS OBJECT

BACKGROUND

Systems for tracking certain attributes of sports objects in motion—i.e., objects that are used in various sports-related activities, such as golf balls, soccer balls, basketballs, baseballs, footballs, tennis balls, hockey pucks, lacrosse ball, cricket ball, flying discs, etc.—can be difficult to implement, expensive, and have limited application in many sporting environments. Aside from determining a current location of such a sports object, which is beneficial for activities like golf, a user (or player) may also wish to gather information related to other desired attributes, such as flight path, launch trajectory, object speed, object spin rate, carry distance, and total distance, among others. Thus, there remains a need for a system that provides components capable of monitoring and tracking such a system during a sporting activity.

Aspects of the present disclosure fulfill these needs and provide further related advantages as described in the following summary.

SUMMARY

Aspects of the present disclosure teach certain benefits in construction and use which give rise to the exemplary advantages described below.

Disclosed examples generally relate to systems for tracking a sports object, and, more particularly, to a system for real-time tracking of a sports object that includes a core assembly with one or more of a multi-layer printed circuit board (PCB) and associated methods of use for monitoring and tracking various attributes associated with the movement of the sports objects.

The disclosed systems and methods provide a compact, multi-purpose system, enclosed in a core assembly that is advantageously incorporated into a sports object without impacting performance of the object. The system employs a variety of transmitting and receiving modalities, and innovative design of components to achieve a durable, simple, and functional system.

Other features and advantages of aspects of the present disclosure will become apparent from the following more detailed description, taken in conjunction with the accompanying drawings, which illustrate, by way of example, the principles of aspects of the disclosure.

BRIEF DESCRIPTION OF THE DRAWINGS

The accompanying drawings illustrate aspects of the present disclosure.

Figure 1B:
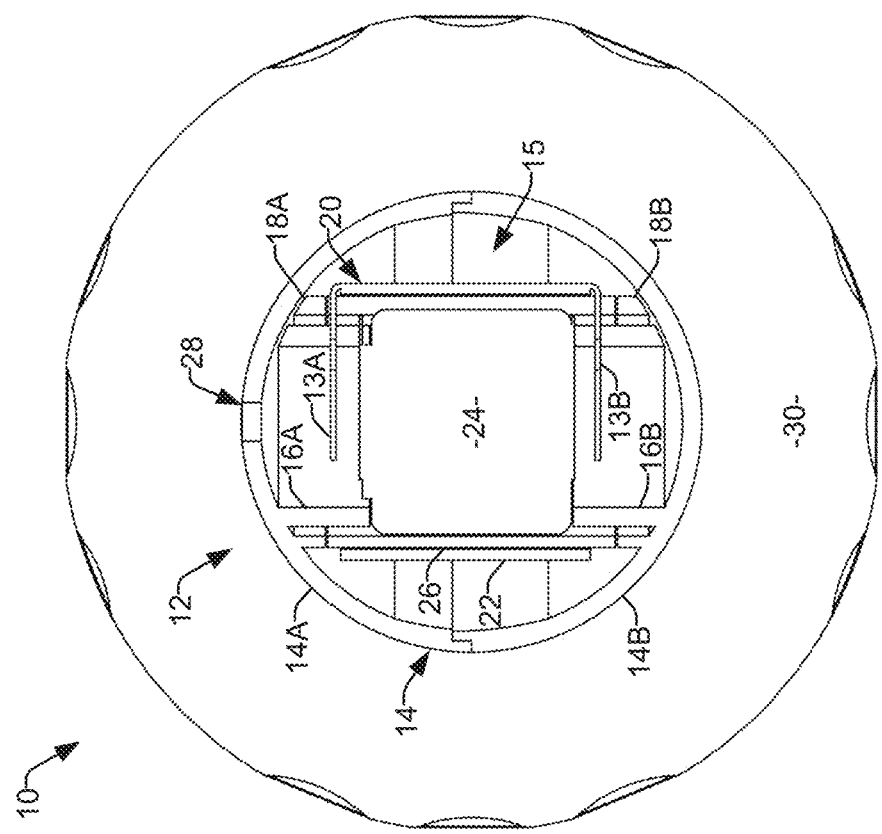
FIGS. 1A and 1B illustrate an exemplary system for tracking a sports object, in accordance with aspects of this disclosure.

The above-described drawing figures illustrate aspects of the disclosed subject matter in at least one of the following examples, which are further defined in detail in the following description. The figures are not necessarily to scale. Features, elements, and aspects of the system that are referenced by the same numerals in different figures represent the same, equivalent, or similar features, elements, or aspects, in accordance with one or more examples.

DETAILED DESCRIPTION

Disclosed are systems and methods for tracking a sports object. In some examples, a sports object includes a core assembly arranged within a shell and having multiple components to receive and transmit signals corresponding to movement of the sports object, as well as to support operational tracking of the sports object.

In disclosed examples, the core assembly includes a multi-layer printed circuit board (PCB) comprised of a plurality of sections. The PCB is configured to at least partially envelope the energy storage device at a geometric center of the assembly.

In some examples, the PCB is connected to one or more antennas (e.g., via one or more contacts), which may be arranged on one or more sections of the PCB, arranged on a surface of the shell, and/or in a volume within the shell.

In some examples, a mold or support structure is arranged within the shell, and configured to hold, mount, and/or otherwise support the PCB and/or the energy storage device. The shell can be configured to enclose the components of the core assembly within the volume, which can be filled with an encapsulant, such as an epoxy resin or other suitable substance.

Through the combined arrangement of the components, along with selection of proper materials, allows the core assembly of the sports object to remain functional through the manufacturing process, as well as during a sporting activity. The disclosed design is operable to withstand a range of pressures and impact forces (e.g., approximately 200-800 pounds-per-square-inch (PSI)), impact force of approximately 2000 lbs, in addition to elevated temperatures (e.g., approximately 150 to 170 degrees C. for 15 seconds or more).

The combination of componentry and materials advantageously yields favorable operational aspects due to the electrical and mechanical properties thereof. The electrical properties, centered around the PCB, include ability to identify and track location of the object (e.g., through a global navigation satellite system (GNSS), motion (e.g., via a gyroscope, accelerometer, magnetometer, etc.), relative position, proximity or movement (e.g., via a gyroscope, magnetometer, ultra-wide band (UWB), etc.), as well as enabling wireless charging of the device (e.g., via high frequency signals, including near-field communications (NFC)), enhanced transmission/receiving signal quality (e.g., via antenna design and matching), data transmission (e.g., low energy Bluetooth (BT), NB IoT, Wi-Fi, long range (LORA) radio communication, cellular), geo-fencing (e.g., BT beacons, UWB tags, LORA, etc.), power management (e.g., motion detection states, wake routines, etc.), and/or extended range BT, LORA, or cellular) (e.g., via long range data communication protocols), as a list of non-limiting example capabilities.

The mechanical properties, comprising and/or supporting the core assembly, include ability to modify and set the center of gravity and/or center of mass (e.g., via PCB size, shape, flexibility; energy storage device size, shape, and placement; etc.), weight (e.g., material selection, balancing, etc.), thermal, impact and shock tolerance (e.g., by selection of core assembly size within deformation limits upon high impact), and antenna construction and arrangement (e.g., of the multiple antennas for various signal transmission/reception events, such as BT, Wi-Fi, GPS L1/L5, wireless charging, etc.), as a list of non-limiting examples.

Advantageously, the completed sports object allows for multiple user application and communication applications, including data collection, data analytics, user identification, user data repository, and data sharing, as a list of non-limiting examples.

In disclosed examples, a system for tracking a sports object includes a sports object having a core assembly enclosed within a shell. The core assembly includes an energy storage device arranged within the shell; and a multi-layer printed circuit board (PCB) comprised of one or more contacts and a plurality of sections, the PCB configured to at least partially envelope the energy storage device; and one or more antennas arranged within the shell, wherein the one or more contacts of the PCB are configured to connect to the one or more antennas.

In some examples, the shell comprises a mount to secure the PCB and the energy storage device and maintain the balance of the components in terms of the center of mass of the shell.

In some examples, the plurality of sections of the PCB are arranged as one or more longitudinal sections and the one or more contacts extend from the one or more longitudinal sections, the one or more longitudinal sections configured to wrap around a length of the energy storage device, and the one or more contacts are configured to cap an end of the energy storage device, and multiple antennas.

In some examples, the plurality of sections comprises of multi-sections of the PCB configured to form a polygonal, cross-section in a variety of shapes when enveloped around the mount and the energy storage device, wherein the shapes include one or more of a triangle, a square, a hexagon or an octagon.

In some examples, the system includes a mold configured to house the energy storage device in a center of the mold, and to support the plurality of sections of the PCB as the PCB envelopes the energy storage device.

In some examples, the mold is dimensioned to fit within the mount.

In some examples, each section of the plurality of sections supports one or more components selected from an inertial movement unit, a gyroscope, an accelerometer, a global navigation satellite system (GNSS) receiver, a magnetometer, a haptic controller, a temperature sensor, a processor, a memory storage device, a BT low energy baseband controller, UWB baseband controller, a cellular baseband controller, a long range (LORA) radio communication baseband controller, a near field communications (NFC) controller, an energy contact, an antenna contact, an antenna, or an induction coil.

In some examples, the energy storage device has a cylindrical, spherical, or prismatic shape.

In some examples, the core assembly further comprises a resin surrounding the PCB and the various electronic components and the energy storage device.

In some examples, the plurality of antennas includes one or more of an ultra-wide band antenna, a blue tooth antenna, or a global positioning system antenna or a NFC antenna.

In some examples, one or more of the plurality of antennas are printed on one or more surfaces of the object.

In some examples, one or more of the plurality of antennas are printed, mounted or embedded on one or more surfaces of the shell.

In some examples, the one or more of the plurality of antennas are printed in a spiral pattern.

In some examples, the one or more of the plurality of antennas are printed, mounted or embedded on one or more sections of the PCB.

In some examples, the energy storage device is a rechargeable energy storage device, the system further comprising an induction coil configured to receive a wireless signal to generate a current to charge the rechargeable energy storage device.

In some examples, the induction coil is arranged on a surface of the shell.

In some examples, the induction coil is printed in a spiral or rectangular shape on one or more surfaces of the shell.

In some disclosed examples, a core assembly for a sports object includes an energy storage device; a printed circuit board (PCB) comprised of one or more contacts and a plurality of sections, the PCB configured to at least partially envelope the energy storage device; a shell comprising a mount to secure the PCB and the energy storage device; and one or more antennas arranged within the shell, wherein the one or more contacts of the PCB are configured to connect to the one or more antennas.

In some examples, the one or more contacts extend from the plurality of sections of the PCB, the plurality of sections configured to wrap around a length of the energy storage device, and the one or more contacts are configured to cap an end of the energy storage device.

In some examples, the plurality of sections comprises six sections, the PCB configured to form a hexagonal cross-section when enveloped around the mount and the energy storage device.

In some examples, the assembly includes a mold configured to house the energy storage device in a center of the mold, and to support the plurality of sections of the PCB as the PCB envelopes the energy storage device.

In some examples, the shell has a spherical exterior shape.

In some examples, the assembly includes one or more weights arranged within the shell to balance mass distribution of the sports object.

In some examples, the sports object is one of a golf ball, a lacrosse ball, a baseball, a softball, a soccer ball, a basketball, a hockey ball, cricket ball, a bowling ball, a rugby ball, or an American football, a cornhole beanbag, or a surf board.

Figure 1A:
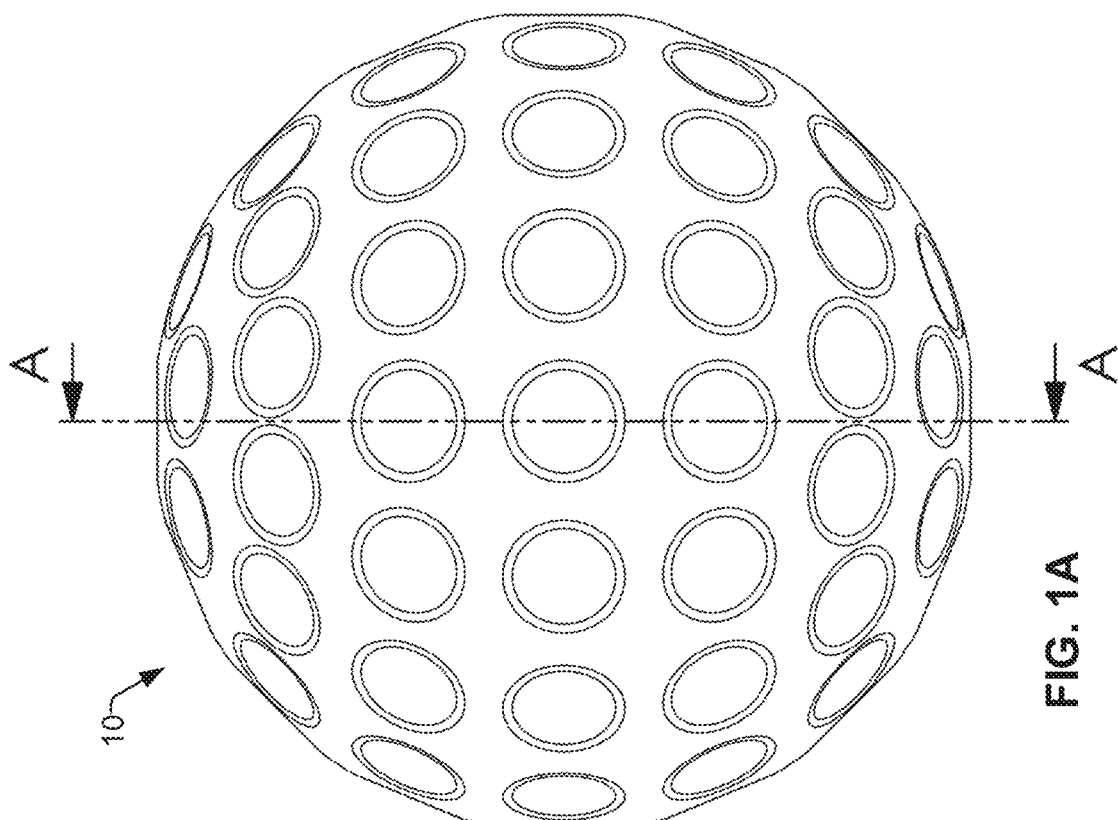

Turning now to the figures, FIGS. 1A and 1B illustrate an exemplary system 10 for tracking a sports object. The system may be incorporated within a sports object, such as a ball, but is not so limited. As shown in FIG. 1B, the system includes a core assembly 12 enclosed within a shell 14 having first and second sections 14A and 14B, respectively. The core assembly 12 can be encapsulated within a material 30 comprising the exterior of the system 10.

In some examples, the core assembly 12 includes an energy storage device 24 arranged within the shell 14, and a printed circuit board (PCB) 20. In some examples, the PCB 20 can include a plurality of sections 22, which can be defined as a multi-layer, which may be flexible, rigid or a combination thereof. One or more contacts 13A, 13B can extend from one or more sections 22, such as to make electrical contact with the energy storage device 24 and/or an antenna (see, e.g., FIG. 4). In some examples, the PCB 20 is configured to at least partially envelope the energy storage device 24.

In some examples, a battery mount or similar support can secure the energy storage device 24, shown as first battery mount 16A and second battery mount 16B. A PCB mount or similar support, shown as first PCB mount 18A and second PCB mount 18B, can secure the PCB 20 and/or a mold 26. For example, the mold 26 is dimensioned to house the energy storage device 24 in a center thereof, to support the plurality of sections 22 of the PCB 20 as the PCB envelopes the energy storage device 24, and to mount within the PCB mounts 18A and 18B.

With the components of the core assembly 12 installed within the shell 14, a volume 15 may surround the components. Based on a size and/or resulting geometry of the components, the volume 15 may exist on one or more sides, such as along the sides of the folded PCB 20 enveloping the energy storage device 24, and/or at top/bottom ends thereof. An opening 28 is provided in the shell 14 to receive a fluid (e.g., a resin) which can fill the volume 15 and harden to encapsulate the internal components and provide support to the shell 14. This opening 28 also provide orientation of the core assembly 12.

In some examples, the encapsulant is selected to have a desired coefficient of restitution (C.O.R) (e.g., approximately 0.4 to 0.8). However, it is the combination of all components, materials, and geometric arrangement thereof that define this property.

Although some examples of the disclosed sports object are illustrated as a golf ball, the core assembly and tracking system can be used as a core for a variety of sporting objects, such as baseballs, softballs, cricket balls, lacrosse balls, field hockey balls, and ice hockey pucks, as a list of non-limiting examples.

Figure 2A:
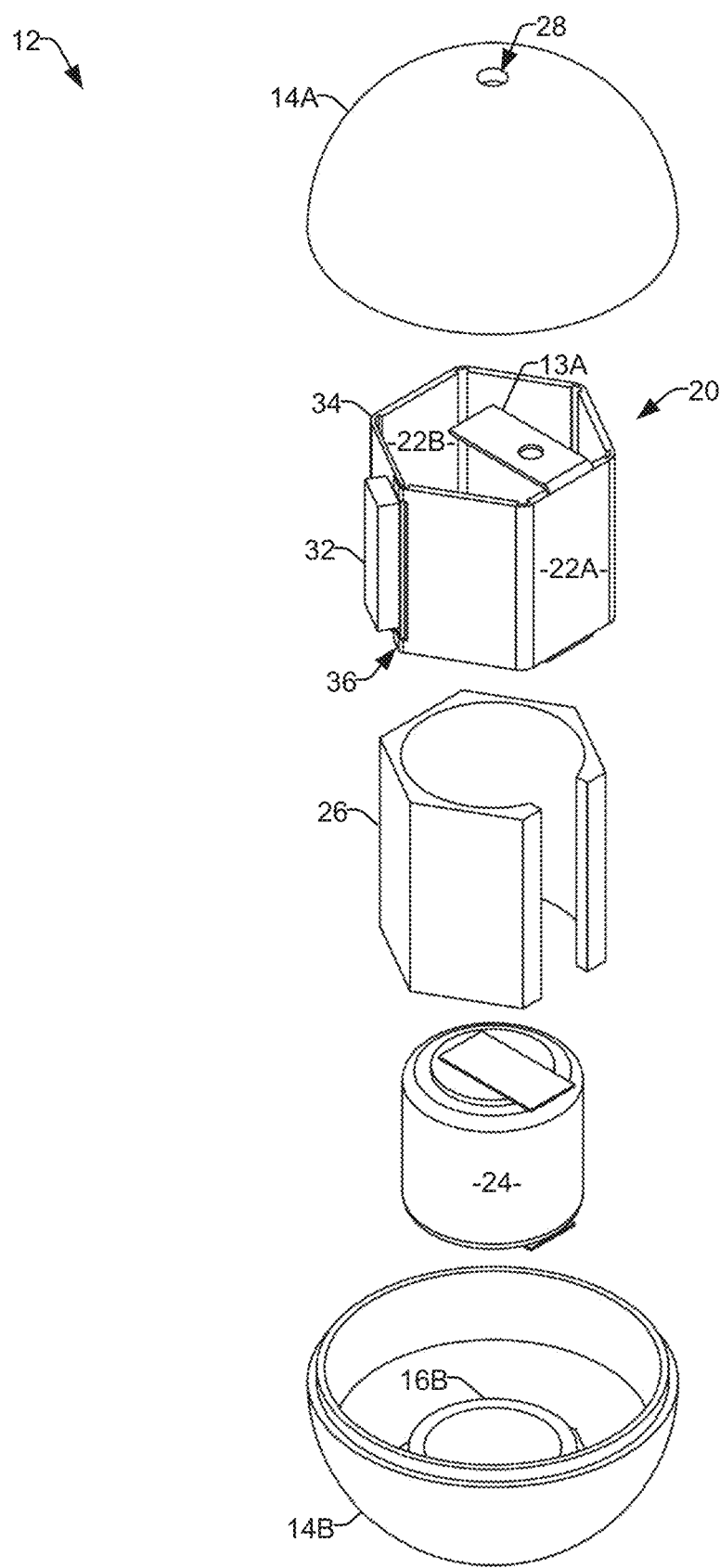
FIG. 2A illustrates an exploded view of an exemplary system for tracking a sports object, in accordance with aspects of this disclosure.

FIG. 2A illustrates an exploded view of an exemplary core assembly 12 for tracking a sports object. The individual components and arrangement thereof enable real-time location and/or motion tracking in high-impact environments.

As shown, sections 22 of the PCB 20 can be folded along seams 34 to result in a hex structure. In some examples, each section has a first surface 22A and a second surface 22B, each of which can support one or more components (which may include component 32), such as processors, antennas, and/or other electrical components. Once assembled, the sections 22 of the PCB 20 can be secured by one or more closing features 36, and/or welded, soldered, glued, or others joined.

The hex structure can be dimensioned to fit around the mold 26, with the energy storage device 24 arranged in the center. Once assembled, the components can be secured to the mounts within the shell 14. The interior arrangement of the components orients and balances the core assembly 12. Moreover, this mounting arrangement holds the PCB 20 in place in a known orientation via a key, as well as providing strain relief for the battery-PCBA connection (e.g., with conductors or contacts 13A, 13B).

The shell 14 can be formed of a rigid or semi-rigid material, such as Nylon, Polycarbonate (PC), Acrylonitrile butadiene styrene (ABS), Polystyrene (PS), Polymethyl methacrylate (PMMA), Polybutadiene (PB), or other thermoplastic or thermoset material, as a list of non-limiting examples. The hardness of the shell material is selected to be within a desired range (e.g., about 25-80 Shore D). The selected material and resulting hardness aids in determining the C.O.R.

The shell 14 define the outer dimensions of the core assembly (in the example of FIG. 2A, approximately 24 mm in diameter, but the disclosed concepts are not so limited).

Figure 2B:
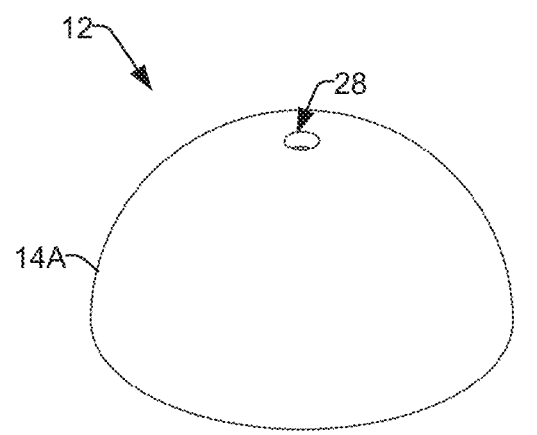
FIGS. 2B and 2C illustrate perspective views of the exemplary system for tracking a sports object, in accordance with aspects of this disclosure.
Figure 2B:
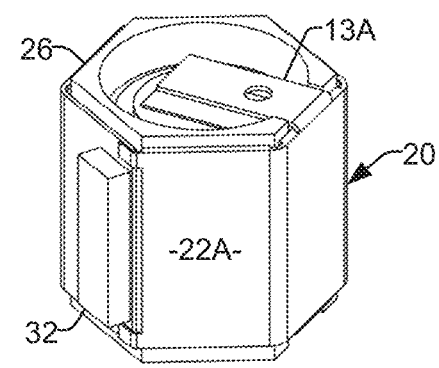
Figure 2C:
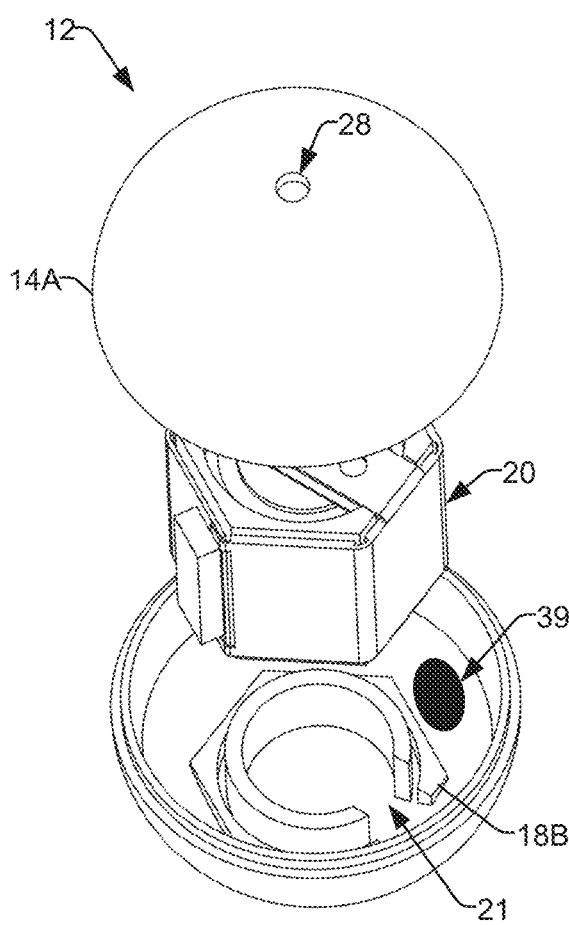

FIGS. 2B and 2C illustrate perspective views of the exemplary core assembly 12. The shell halves 14A and 14B mate at an interface 38 operable to hold the shell halves 14A and 14B together. This interface 38 can be snap fit, a threaded feature, an adhesive/epoxy bonded joint, and thermal welded (such as laser, ultrasonic, or hot plate welding), as a list of non-limiting examples.

Once the core assembly is completed, the shell and the components are potted/encapsulated (e.g., with one or more of a resin, epoxy, silicones, polyurethanes, etc.). The encapsulant holds the core assembly 12 together as a solid unit while protecting the electronics and battery inside. In some examples, the durometer of the encapsulant compound will be in the range of 35-95 A depending on the desired C.O.R.

In lieu of the shell 14, the electronics and support can be overmolded using low-pressure molding to contain all the components. In some examples, this can replace the shell and encapsulant, whereas in other examples it is provided in addition to the shell 14.

A constructed core assembly 12 can be trim-balanced to adjust a center of mass of the core assembly (e.g., within the shell) to provide a desired weight distribution. To determine the core assembly's center of mass, the core is rotated across three axes (e.g., roll, pitch, and yaw). For example, each axis is spun independently and a correction can be applied for any imbalance. The correction will be done by adding material of various densities or removing material from the exterior of the shell.

For instance, weights 39 can be arranged within and/or about the shell 14 to balance mass distribution of the core assembly 12 and/or the sports object.

Figure 3:
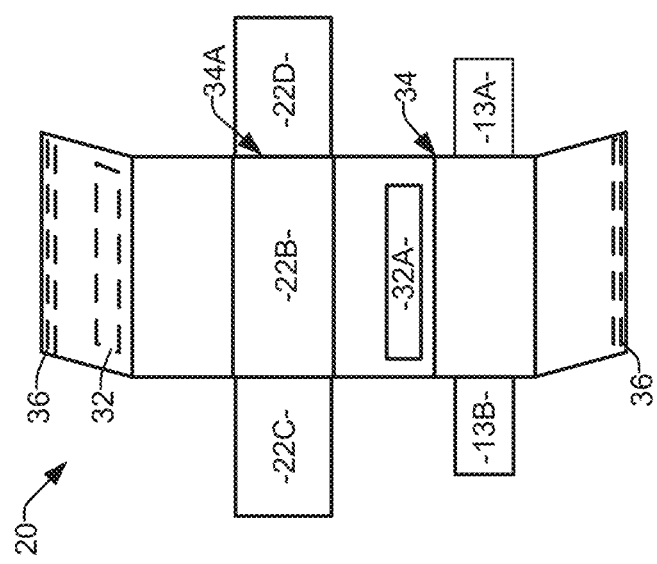
FIG. 3 illustrates an exemplary multi-panel printed circuit board, in accordance with aspects of this disclosure.

FIG. 3 illustrates an exemplary multi-panel printed circuit board 20. As shown, the PCB 20 includes a plurality of sections, panels, or boards 22A, 22B, 22C, 22D. The PCB 20 is configured to support one or more components 32 (on surface 22A) and/or 32A (on surface 22B). The components can be selected from one or more of an inertial movement unit, a gyroscope, an accelerometer, a GNSS receiver, a magnetometer, a haptic controller, a temperature sensor, a processor, a memory storage device, a BT low energy baseband controller, UWB baseband controller, a NFC controller, an energy contact, an antenna contact, an antenna, or an induction coil, as a list of non-limiting examples.

In some examples, sections 22C and/or 22D can be arranged on opposite ends of a section 22B. The sections 220, 22D can be attached to section 22B by a joint or fold 34A, which allows the sections 220, 22D to fold on the ends of the PCB 20 (such as atop the contacts 13A, 13B) for placement within the shell 14. In this manner, components incorporated on sections 22C, 22D (such as antennas) are positioned at ends of the PCB 20 (at a top and/or bottom) within the shell 14. In an example, antennas can be placed on one or more of the sections 22A, 22B, 22C, 22D to provide a more complete antenna system for receiving and/or transmitting signals.

The PCB can be formed as a rigid, flex format so that it can be wrapped around the rigid mold 26 (e.g., a PCB hex support structure). This structure has a hexagonal shape to allow the PCB to be wrapped around it for ease of manufacturing. There is a space in the center to allow for ease of placement of the energy storage device 24 and aid in the connection of the battery to the PCB.

This structure also provides a fixed orientation for the PCB 20 and energy storage device 24 (by employing a clocking feature 21, for example). Arranging the components in a fixed orientation aids with maintaining a known center of mass as well as controlling the direction of components such as antennas, radios, and/or wireless charging, as a list of non-limiting examples.

As shown in FIG. 3, the PCB 20 includes six sections 22, and thus the mold 26 is shaped as a hexagon. Thus, the PCB 20 is configured to form a hexagonal cross-section when enveloped around the mold 26 and the energy storage device 24. Although some examples illustrated the PCB as being partitioned into six sections, in some examples the PCB has two, three, four, five, seven, eight, nine, ten, or more sections, each section separated by a flexible joint. In some examples, the PCB is a substantially flexible substrate, and can wrap around a cylindrically or prismatic shaped mold. For instance, the PCB can be configured to form a triangular, a square, a hexagonal, an octagonal, or other cross-section when enveloped around the mount and the energy storage device. In some examples, the PCB can be constructed to form a polygonal geometry that surrounds the energy storage device on multiple sides. For instance, a generally spherical geometry, such as a truncated icosahedron akin to a soccer ball. Each panel can hold an antenna to form a phased array antenna, resulting in an improved receiver as well as enhanced structural support.

Further, although in some examples the PCB is illustrated as having a length greater than a width or diameter, in some examples the length and width are equal, and in other examples the width is greater than the length.

In some examples, antennas are incorporated on the PCB 20, and may include one or more of an ultra-wide band (UWB) antenna, a blue tooth antenna, or a global navigation satellite system (GNSS) antenna or a NFC antenna, as a list of non-limiting examples.

For instance, a GPS Multiband L1/L5 satellite system can be used to improve location accuracy of the object. A UWB can be employed as a baseband receiver to enable sub-centimeter location accuracy as the object is hit and approaches a target (e.g., within a confined indoor or outdoor, monitored area such as a putting green). Moreover, one or more multi-axis inertial movement units (IMU), such as a three-axis gyroscope and/or a three-axis accelerometer. In some examples, a nine-axis IMU (include a magnetometer, for instance) can be used to enable directional capability relative to Earth.

In some examples, the energy storage device 24 is a rechargeable energy storage device (e.g., a Lithium-ion battery), and the system 10 includes an induction coil configured to receive a wireless signal to generate a current to charge the rechargeable energy storage device. The induction coil can be arranged on a surface of the shell 14 (internal or external), and/or within the material 30. Capacity for the rechargeable energy storage device is selected to allow operational use of the system 10 (e.g., about 15 to 50 mAH). This may allow a golf ball to be used for single or multiple rounds of golf before recharging, for instance.

Wireless charging of the rechargeable energy storage device uses NFC in some examples, with one or more sections of the PCB including components or circuits for charging and/or monitoring the rechargeable energy storage device. For example, the induction coil can be printed or otherwise arranged on a separate section and indexed to ensure alignment with a transmitter coil in a corresponding charger (not shown).

In some examples, the induction coil is arranged in, on or about the shell 14 away from other antennas. For instance, the system can cause the induction coil, the one or more electrical components, and/or the one or more antennas to shut-off or become unavailable so as not to impact operation of other components. In some examples, the various transmitters and/or receivers (e.g., GNSS, BT, WiFi, LORA, cellular, etc.) are multiplexed or frequency split to isolate any associated signals if they are operating concurrently.

In some examples, the system employs a gateway at the PCB to selectively connect to power the component(s) being used at a given point during operation. In some examples, induction charging can be limited to a range of frequencies (e.g., from 6.5 MHz to 13.56 MHz) to avoid interfering with or causing damage to other electrical components.

Figure 4:
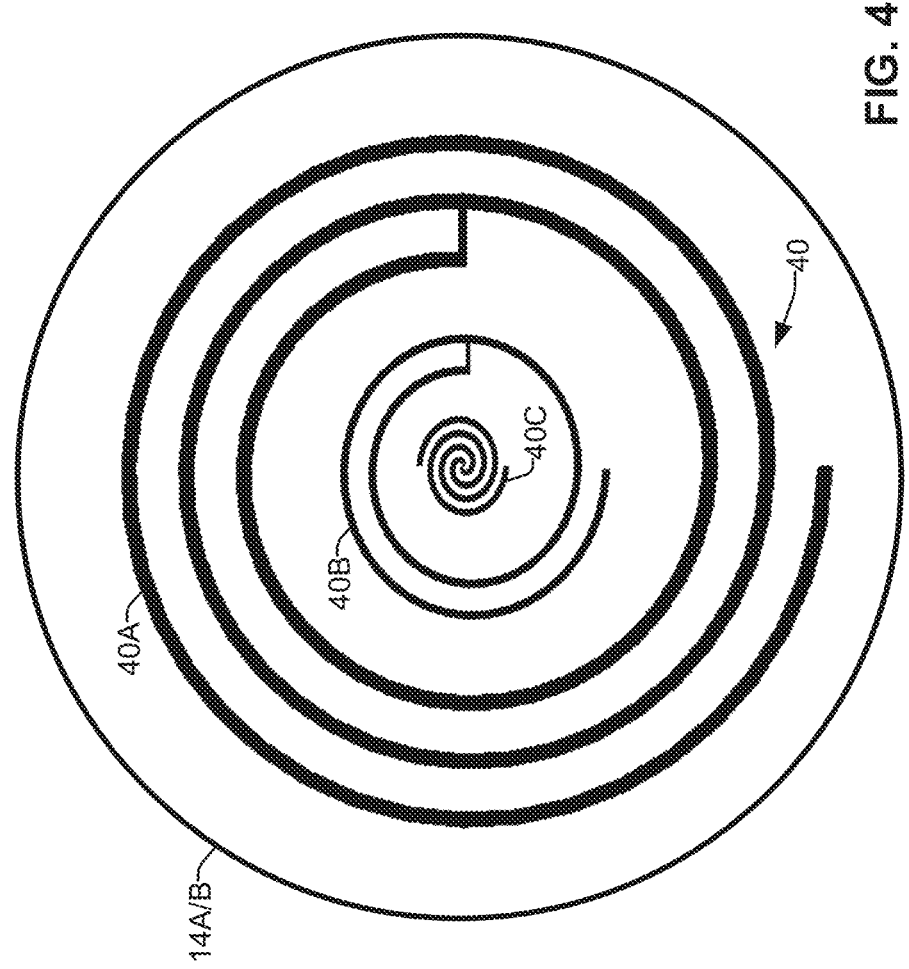
FIG. 4 illustrates an exemplary antenna arrangement, in accordance with aspects of this disclosure.

FIG. 4 illustrates an exemplary arrangement for one or more antennas 40. For example, the antennas can be printed on one or more surfaces of the object, including one or more surfaces of one or both of the shell halves 14A and 14B, and/or within material 30.

As shown, each antenna 40A, 40B, and 40C are arranged in a spiral pattern, and are prepared with electrical connections with the PCB 20. This allows communication signals to be shared between components on the PCB 20 and external transceivers. The antennas 40 may include any of the various antennas disclosed herein, but are not so limited. Further, one or more of the antennas 40A, 40B, and 40C could be employed as an induction coil to receive power to recharge the energy storage device 24.

Figure 5:
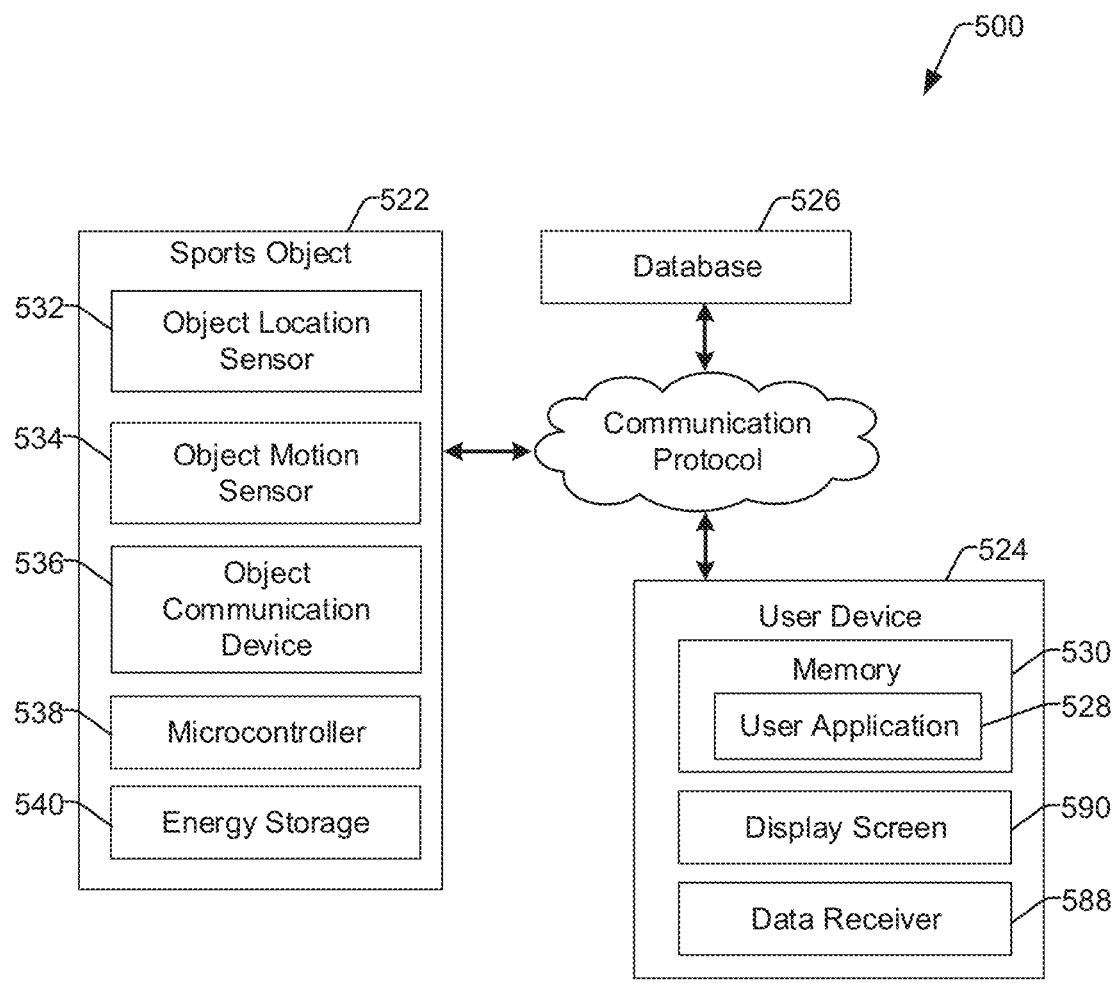
FIG. 5 is an architecture diagram of an exemplary control and/or communications structure, in accordance with aspects of this disclosure.

Turning now to FIG. 5, there is shown a simplified schematic view of an exemplary real-time tracking system 500 for an exemplary sports object 10, as disclosed herein. The system 500 provides one or more sports object 522 (e.g., comprising tracking system 10 and/or core assembly 12) and a user device 524 in selective communication with the sports object 522. In some examples, a database 526 is in communication (either locally or remotely) with the user device 524 and configured for selectively storing data related to the sports object 522 and the associated user device 524. In some examples, the user device 524 and database 526 are one and the same—as such, it is intended that those terms as used herein are to be interchangeable with one another.

In some examples, the user device 524 and database 526 are omitted, such that the system 500 and associated methods described herein are implemented solely through the sports object 522—thus, any methods or functionality described herein as being carried out by the user device 524 or database 526 may also be carried out by the sports object 522.

The term "sports object" includes any object that is used in various sports-related activities, such as golf balls, soccer balls, basketballs, baseballs, footballs, tennis balls, lacrosse ball, cricket ball, hockey pucks, and flying discs, as a list of non-limiting examples. Thus, while examples of the system 500 and associated methods are discussed in the context of golf for illustrative purposes, the disclosed concepts are not so limited. Rather, the system 500 and associated methods may be incorporated into any other type of sports objects now known or later developed.

Communication between each of the sports object 522, user device 524, and database 526 may be achieved using any wired- or wireless-based communication protocol (or combination of protocols) now known or later developed. As such, the disclosed concepts should not be limited to any one particular type of communication protocol, even though certain exemplary protocols may be mentioned herein for illustrative purposes. The term "user device" is intended to include any type of computing or electronic device, now known or later developed, capable of communicating with the sports object 522—such as desktop computers, mobile phones, smartphones, laptop computers, tablet computers, personal data assistants, gaming devices, wearable devices, etc. As such, the system 500 should not be limited to use with any one particular type of computing or electronic device, even though certain exemplary devices may be mentioned or shown herein for illustrative purposes.

With continued reference to FIG. 5, each of the sports object 522, user device 524, and database 526 contains the hardware and/or software necessary to carry out the exemplary methods for monitoring and tracking various attributes associated with the movement of the sports object 522, as described herein. Furthermore, the user device 524 comprises a plurality of computing devices selectively working in concert with one another to carry out the exemplary methods for monitoring and tracking various attributes associated with the movement of the sports object 522, as disclosed herein.

The user device 24 provides a user application 528 residing locally in memory 530 on the user device 524, the user application 528 being configured for selectively communicating with the sports object 522. The term "memory" is intended to include any type of electronic storage medium (or combination of storage mediums) now known or later developed, such as local hard drives, RAM, flash memory, secure digital ("SD") cards, external storage devices, network or cloud storage devices, integrated circuits, etc. In some examples, the user device 524 is in the possession (or otherwise under the control) of a user who is desirous of utilizing the system 500 for monitoring and tracking various attributes associated with the movement of the sports object 522.

In some examples, the sports object 522 provides one or more object location sensor 532 configured for determining at least one of a current latitude, longitude and altitude of the sports object 522. As disclosed herein, the object location sensor 532 can be any type of movement or positioning sensor. One or more object motion sensors 534 are configured for determining at least one motion attribute of the sports object 522. For instance, the object motion sensor 534 can be a gyroscope, accelerometer, magnetometer, temperature sensor, UWB RF Signal time of flight (TOF) sensor/determination, BT enabled Angular Rate of arrival sensor/determination or Received Signal Strength Indicator (RSSI), etc.

The sports object 522 further provides an object communication device 536 configured for selectively communicating with the user device 524. For example, the object communication device 536 can be any suitable wired or wireless enabled device, such as BT, cellular, Wi-Fi, LORA, or long range FM for example. In some examples, the sports object 522 further provides a microcontroller 538 in electrical communication with each of the object location sensor 532, object motion sensor 534, and object communication device 536, the microcontroller 538 configured for controlling each of the respective components and for facilitating communication of data therebetween. For example, each of the object location sensor 532, object motion sensor 534, and object communication device 536, the microcontroller 538 can be arranged on a single PCB, such as PCB 20.

In at least one example, a battery 540 (e.g., energy storage device 24) is configured for selectively providing power to each of the object location sensor 532, object motion sensor 534, object communication device 536, and microcontroller 538.

In some examples, the user device 524 and/or the database 526 are configured to store and/or manage flight data containing various details related to the sports object 522, preferably each time the sports object 522 is put into motion (i.e., thrown, hit, kicked, etc.). In some examples, the flight data includes (but is not limited to) at least one of a unique object identifier (such as an alphanumeric name, for example), a start location value containing the geographic coordinates of the sports object 522 prior to being put into motion, an end location value containing the geographic coordinates of the sports object 522 after subsequently coming to rest, an altitude value containing the altitude reached by the sports object 522 while in motion, a flight path value containing details related to the flight path of the sports object 522 while in motion, a launch trajectory value containing details related to the launch trajectory of the sports object 522 as it was put into motion, a speed value containing the speed reached by the sports object 522 while in motion, a spin rate value containing the spin rate of the sports object 522 while in motion, a travel distance value containing the distance between the start location and end location values, a distance to goal value containing the distance between the sports object 522 and the location toward which the sports object 522 is being moved (i.e., goal, hoop, hole, basket, etc.), a timestamp value containing at least one of a date and time at which the associated shot data is collected (i.e., the timestamp associated with the particular throw/hit/kick/etc. of the sports object 522), an environmental conditions table containing details related to select environmental conditions in which the sports object 522 is being used (i.e., weather conditions, playing field conditions, etc.), a club used value containing details related to the particular golf club used to hit the sports object 522 (where the sports object 522 is a golf ball), and a swing count value containing details related to the particular swing/stroke number associated with the current sports object 522 hit (again, where the sports object 522 is a golf ball).

Methods and processes of collecting information are provided in U.S. patent application Ser. No. 15/863,795, entitled "Real-Time Tracking System for Sports Scoring Objects and Methods of Use", which is herein incorporated by reference in its entirety.

Referring again to FIG. 5, in some examples, the user device 524 provides a data receiver 588 configured for receiving the selectively transmitted data from the object communication device 536 of the sports object 522. Additionally, in an example, the user device 524 provides an at least one display screen 590 configured for displaying the sports object 522 data in real-time. In an example, the display screen 590 is a touchscreen.

A system for real-time tracking a sports objects and associated methods of use are disclosed and configured for monitoring and tracking various attributes associated with the movement of sports objects. Because the principles of the disclosed subject matter may be practiced in a number of configurations and/or applications beyond those shown and described, it is to be understood that the disclosure is not in any way limited by the provided examples, but is generally directed to a real-time tracking system for sports objects and is able to take numerous forms to do so without departing from the spirit and scope of the disclosed examples. One skilled in the art would appreciate the disclosed subject matter is not limited to the particular geometries and materials of construction disclosed, but may instead entail other functionally comparable structures or materials, now known or later developed, without departing from the spirit and scope of this disclosure.

Unless otherwise indicated, all numbers expressing a characteristic, item, quantity, parameter, property, term, and so forth used in the present specification and claims are to be understood as being modified in all instances by the term "about." As used herein, the term "about" means that the characteristic, item, quantity, parameter, property, or term so qualified encompasses a range of plus or minus ten percent above and below the value of the stated characteristic, item, quantity, parameter, property, or term. Accordingly, unless indicated to the contrary, the numerical parameters set forth in the specification and attached claims are approximations that may vary. At the very least, and not as an attempt to limit the application of the doctrine of equivalents to the scope of the claims, each numerical indication should at least be construed in light of the number of reported significant digits and by applying ordinary rounding techniques. Notwithstanding that the numerical ranges and values setting forth the broad scope of the disclosure are approximations, the numerical ranges and values set forth in the specific examples are reported as precisely as possible. Any numerical range or value, however, inherently contains certain errors necessarily resulting from the standard deviation found in their respective testing measurements. Recitation of numerical ranges of values herein is merely intended to serve as a shorthand method of referring individually to each separate numerical value falling within the range. Unless otherwise indicated herein, each individual value of a numerical range is incorporated into the present specification as if it were individually recited herein.

Use of the terms "may" or "can" in reference to an example or aspect of an example also carries with it the alternative meaning of "may not" or "cannot." As such, if the present specification discloses that an example or an aspect of an example may be or can be included as part of the inventive subject matter, then the negative limitation or exclusionary proviso is also explicitly meant, meaning that an example or an aspect of an example may not be or cannot be included as part of the inventive subject matter. In a similar manner, use of the term "optionally" in reference to an example or aspect of an example means that such example or aspect of the example may be included as part of the inventive subject matter or may not be included as part of the inventive subject matter. Whether such a negative limitation or exclusionary proviso applies will be based on whether the negative limitation or exclusionary proviso is recited in the claimed subject matter.

The terms "a," "an," "the" and similar references used in the context of describing the present disclosure (especially in the context of the following claims) are to be construed to cover both the singular and the plural, unless otherwise indicated herein or clearly contradicted by context. Further, ordinal indicators—such as "first," "second," "third," etc.— for identified elements are used to distinguish between the elements, and do not indicate or imply a required or limited number of such elements, and do not indicate a particular position or order of such elements unless otherwise specifically stated. All methods described herein can be performed in any suitable order unless otherwise indicated herein or otherwise clearly contradicted by context. The use of any and all examples, or exemplary language (e.g., "such as") provided herein is intended merely to better illuminate the present disclosure and does not pose a limitation on the scope of the disclosure otherwise claimed. No language in the present specification should be construed as indicating any non-claimed element essential to the practice of the disclosure.

When used in the claims, whether as filed or added per amendment, the open-ended transitional term "comprising" (along with equivalent open-ended transitional phrases thereof such as "including," "containing" and "having") encompasses all the expressly recited elements, limitations, steps and/or features alone or in combination with un-recited subject matter; the named elements, limitations and/or features are essential, but other unnamed elements, limitations and/or features may be added and still form a construct within the scope of the claim. Specific examples disclosed herein may be further limited in the claims using the closed-ended transitional phrases "consisting of" or "consisting essentially of" in lieu of or as an amendment for "comprising." When used in the claims, whether as filed or added per amendment, the closed-ended transitional phrase "consisting of" excludes any element, limitation, step, or feature not expressly recited in the claims. The closed-ended transitional phrase "consisting essentially of" limits the scope of a claim to the expressly recited elements, limitations, steps and/or features and any other elements, limitations, steps and/or features that do not materially affect the basic and novel characteristic(s) of the claimed subject matter. Thus, the meaning of the open-ended transitional phrase "comprising" is being defined as encompassing all the specifically recited elements, limitations, steps and/or features as well as any optional, additional unspecified ones. The meaning of the closed-ended transitional phrase "consisting of" is being defined as only including those elements, limitations, steps and/or features specifically recited in the claim, whereas the meaning of the closed-ended transitional phrase "consisting essentially of" is being defined as only including those elements, limitations, steps and/or features specifically recited in the claim and those elements, limitations, steps and/or features that do not materially affect the basic and novel characteristic(s) of the claimed subject matter. Therefore, the open-ended transitional phrase "comprising" (along with equivalent open-ended transitional phrases thereof) includes within its meaning, as a limiting case, claimed subject matter specified by the closed-ended transitional phrases "consisting of" or "consisting essentially of." As such, examples described herein or so claimed with the phrase "comprising" are expressly or inherently unambiguously described, enabled and supported herein for the phrases "consisting essentially of" and "consisting of."

All patents, patent publications, and other publications referenced and identified in the present specification are individually and expressly incorporated herein by reference in their entirety for the purpose of describing and disclosing, for example, the compositions and methodologies described in such publications that might be used in connection with the present disclosure. These publications are provided solely for their disclosure prior to the filing date of the present application. Nothing in this regard should be construed as an admission that the inventors are not entitled to antedate such disclosure by virtue of prior disclosure or for any other reason. All statements as to the date or representation as to the contents of these documents is based on the information available to the applicants and does not constitute any admission as to the correctness of the dates or contents of these documents.

It should be understood that the logic code, programs, modules, processes, methods, and the order in which the respective elements of each method are performed are purely exemplary. Depending on the implementation, they may be performed in any order or in parallel, unless indicated otherwise in the present disclosure. Further, the logic code is not related, or limited to any particular programming language, and may comprise one or more modules that execute on one or more processors in a distributed, non-distributed, or multiprocessing environment.

The methods as described above may be used in the fabrication of integrated circuit chips. The resulting integrated circuit chips can be distributed by the fabricator in raw wafer form (that is, as a single wafer that has multiple unpackaged chips), as a bare die, or in a packaged form. In the latter case, the chip is mounted in a single chip package (such as a plastic carrier, with leads that are affixed to a motherboard or other higher level carrier) or in a multi-chip package (such as a ceramic carrier that has either or both surface interconnections or buried interconnections). In any case, the chip is then integrated with other chips, discrete circuit elements, and/or other signal processing devices as part of either (a) an intermediate product, such as a motherboard, or (b) an end product. The end product can be any product that includes integrated circuit chips, ranging from toys and other low-end applications to advanced computer products having a display, a keyboard or other input device, and a central processor.

While aspects of the disclosure have been described with reference to at least one exemplary example, it is to be clearly understood by those skilled in the art that the disclosure is not limited thereto. Rather, the scope of the disclosure is to be interpreted only in conjunction with the appended claims and it is made clear, here, that the inventor(s) believe that the claimed subject matter is the disclosure.

What is claimed is:

1. A system for tracking a sports object comprising:
a sports object having a spherical core assembly enclosed within a spherical shell, wherein the core assembly comprises:
a rechargeable energy storage device arranged within the spherical shell;
a multi-layer printed circuit board (PCB) comprised of one or more contacts and a plurality of sections, the PCB configured to at least partially envelop the energy storage device; and
a plurality of antennas arranged within the spherical shell,
wherein the one or more contacts of the PCB are configured to connect to the plurality of antennas,
wherein a first antenna of the plurality is printed in a spiral pattern on one or more internal surfaces of the spherical shell,
wherein the first antenna is further configured to be employed as an induction coil to receive power to recharge the energy storage device, and
wherein a second antenna of the plurality is printed, mounted, or embedded on one or more sections of the PCB.

2. The system of claim 1, wherein a third antenna of the plurality is printed, mounted, or embedded on one or more external surfaces of the spherical shell.

3. The system of claim 1, wherein one or more of the plurality of sections of the PCB is a longitudinal section, wherein a first section is on one end of the longitudinal section and a second section is on the opposite end of the longitudinal section.

4. The system of claim 3, wherein the second antenna is positioned on the first section of the PCB.

5. The system of claim 4, wherein a third antenna of the plurality is positioned on the second section of the PCB.

6. The system of claim 1, wherein the spherical shell comprises a mount to secure the PCB and the energy storage device and maintain the balance of the components in terms of mass of the spherical shell.

7. The system of claim 6, wherein each section of the plurality of sections of the PCB are arranged as one or more longitudinal sections and the one or more contacts extend from the one or more longitudinal sections, the one or more longitudinal sections configured to wrap around a length of the energy storage device, and the one or more contacts are configured to cap an end of the energy storage device, and one or more of the plurality of antennas.

8. The system of claim 6, wherein the plurality of sections comprises of multi-sections of the PCB configured to form a polygonal, cross-section in a variety of shapes when enveloped around the mount and the energy storage device, wherein the shapes include one or more of a triangle, a square, a hexagon, or an octagon.

9. The system of claim 6, further comprising a mold configured to house the energy storage device in a center of the mold, and to support the plurality of sections of the PCB as the PCB envelops the energy storage device.

10. The system of claim 9, wherein the mold is dimensioned to fit within the mount.

11. The system of claim 1, wherein each section of the plurality of sections supports one or more components selected from an inertial movement unit, a gyroscope, an accelerometer, a global navigation satellite system (GNSS) receiver, a magnetometer, a haptic controller, a temperature sensor, a processor, a memory storage device, a BT low energy baseband controller, a UWB baseband controller, a cellular baseband controller, a long range (LORA) radio communication baseband controller, a near field communications (NFC) controller, or an energy contact.

12. The system of claim 11, wherein the energy storage device has a cylindrical, spherical, or prismatic shape.

13. The system of claim 1, wherein the core assembly further comprises a resin surrounding the PCB and the various electronic components and the energy storage device.

14. The system of claim 1, wherein the plurality of antennas includes one or more of an ultra-wide band antenna, a blue tooth antenna, a global positioning system antenna, or an NFC antenna.

15. The system of claim 14, wherein the first antenna includes one or more of an ultra-wideband antenna, a global positioning antenna, or an NFC antenna and the second antenna includes one or more of a blue tooth antenna.

16. A system for tracking a sports object comprising:
a sports object having a core assembly enclosed within a spherical shell, wherein the core assembly comprises:
an energy storage device arranged within the spherical shell;
a multi-layer printed circuit board (PCB) comprised of one or more contacts and a plurality of sections, the PCB configured to at least partially envelop the energy storage device; and
a plurality of antennas arranged within the spherical shell,
wherein the one or more contacts of the PCB are configured to connect to the plurality of antennas,
wherein a first antenna of the plurality is printed, mounted, or embedded on one or more external surfaces of the spherical shell,
wherein a second antenna of the plurality is printed in a spiral pattern on one or more internal surfaces of the spherical shell, and wherein a third antenna of the plurality is printed, mounted, or embedded on one or more sections of the PCB.

17. The system of claim 16, wherein a fourth antenna of the plurality is printed, mounted, or embedded on one or more external surfaces of the sports object.

18. The system of claim 17, wherein the energy storage device is rechargeable.

19. The system of claim 18, wherein the fourth antenna is configured to be employed as an induction coil to receive power to recharge the energy storage device.

20. The system of claim 17, wherein the fourth antenna is printed in a spiral pattern.

* * * * *